INVENTORS
GRAHAM R. HUNT
HOWARD P. ROSS

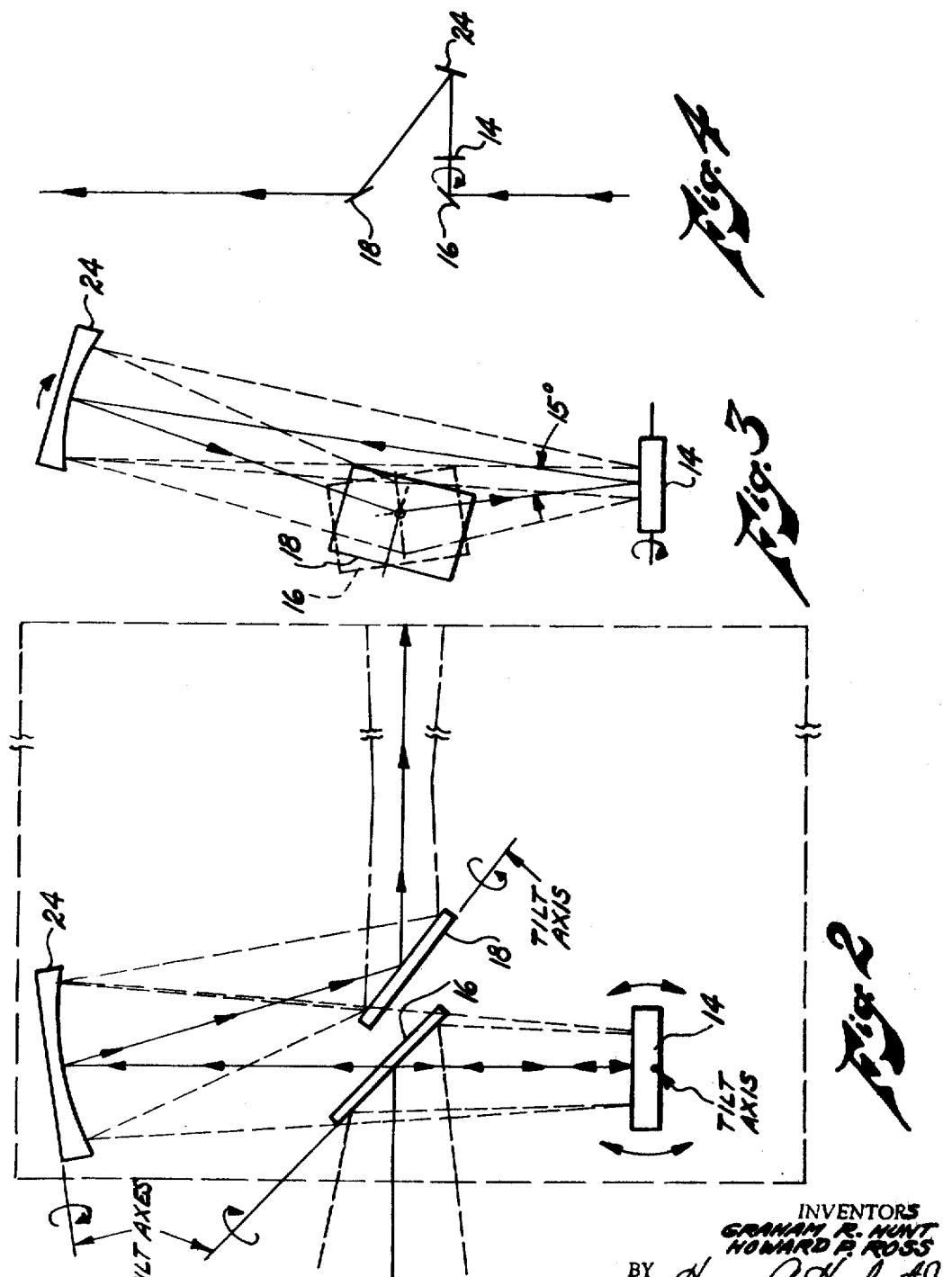

United States Patent Office 3,506,365
Patented Apr. 14, 1970

3,506,365
BIDIRECTIONAL REFLECTION ATTACHMENT
FOR A DOUBLE BEAM SPECTROPHOTOMETER
Graham R. Hunt, Winchester, Mass., and Howard P. Ross, Salt Lake City, Utah, assignors to the United States of America as represented by the Secretary of the Air Force
Filed Jan. 31, 1968, Ser. No. 702,126
Int. Cl. G01n 21/48
U.S. Cl. 356—244                    4 Claims

ABSTRACT OF THE DISCLOSURE

A bidirectional reflection attachment for a double beam spectrophotometer which allows accurate measurements to be taken while the sample is illuminated from above. The attachment having a plurality of mirrors for focusing the beam emanating from a spectrophotometer upon the sample examined. The sample holder is adjustable so that it can be tilted ±45° from the horizontal and can be raised or lowered so that the upper surface of the sample may be conveniently brought to a focus point.

BACKGROUND OF THE INVENTION

This invention relates generally to spectrophotometers and more particularly to a bidirectional reflectance attachment for use in such a spectrophotometer.

The rapid increase in the development and use of remote sensing techniques has created a need for a new type of laboratory spectroscopic information. This information is needed to design more definitive experiments and to interpret the data obtained from terrestrial and extraterrestrial targets. The data obtained in remote sensing situations is usually in the form of the intensities of radiation (in specified wavelength intervals) reflected or emitted from the earth, lunar or planetary surfaces.

To be useful in design and interpretation, laboratory spectra must be obtained of natural materials under conditions that simulate the remote sensing situation as closely as possible. The targets may be rock and mineral surfaces (in various states of aggregation), vegetation or liquid.

Most commercially available spectrophotometers are designed for absorption or transmission measurements, but accessories are available from the manufacturers for performing other types of measurements. The available spectral reflectance accessories require that the sample be mounted vertically or horizontally with the beam impinging on the sample from below. For diffuse reflectance measurements the commercial accessories commonly use an integrating ring, hemisphere or sphere. An inherent limitation of these accessories is that they do not reproduce the remote sensing, data gathering situation. There is no commercially available bidirectional reflectance attachment which allows the sample to be irradiated from above, and thus does not restrict the type of material to be investigated.

SUMMARY OF THE INVENTION

The instant invention overcomes the above limitations by permitting the direct measurement of bidirectional reflectance, relative to any selected reference, of solid, powdered or liquid samples.

The bidirectional reflectance attachment of the instant invention easily fits into the sample and reference compartment of any conventional double beam spectrophotometer such as the Cary 14 spectrophotometer, and without removal therefrom permits experimentation in the ultraviolet, visible and infrared ranges.

Preparation of a sample surface is done outside the spectrophotometer and the sample is then placed within the sample holder of the attachment. In the instant invention, the bidirectional light beam emanating from the spectrophotometer is incident from above, so that surfaces which are irregular (weathered rocks, lava) unconsolidated (sands, powders) liquids or fragile (snow, mud, vegetation) as well as polished samples can be conveniently examined. The sample holder can be rotated up to ±45° from the horizontal by means of a gear assembly to permit collecting data for construction of indicatrices. Furthermore, the sample holder can be easily raised or lowered by rotation of a knob so that samples of different thicknesses may be located exactly at the focal plane. By having equivalent attachments for the reference and sample compartments an equivalent optical path is followed in both the reference and sample beams, so that absorption effects within the instrument tend to cancel each other. Finally, in the instant invention all mirrors are easily adjustable to facilitate optimum optical alignment.

It is therefore the primary object of this invention to provide a reflectance attachment for a conventional spectrophotometer which permits accurate measurements to be taken with a bidirectional source while allowing the sample to be illuminated from above.

It is another object of this invention to provide a reflectance attachment which is easily placed in and removed from the sample and reference compartments of a conventional spectrophotometer.

It is still a further object of this invention to provide a reflectance attachment for a conventional spectrophotometer which has a sample holder capable of ±45° of rotation from the horizontal and which may be easily raised or lowered so that the upper surface of the sample may be conveniently brought to a focus point.

It is still another object of this invention to provide a reflectance attachment for a conventional spectrophotometer which is economical to produce and utilizes conventional, currently available components that lend themselves to standard mass production manufacturing techniques.

DESCRIPTION OF THE DRAWINGS

In the drawings:

FIGURE 1 represents a perspective schematic view of the bidirectional reflectance attachment of this invention;

FIGURE 3 is an end orthogonal view of the optical path of a beam of light emanating from a conventional spectrophotometer and entering the reflectance attachment of this invention;

FIGURE 4 is a plan orthogonal view of the optical path of a beam of light emanating from a conventional spectrophotometer and entering the reflectance attachment of this invention.

DESCRIPTION OF THE PREFERRED EMBODIMENT

Figure 2:
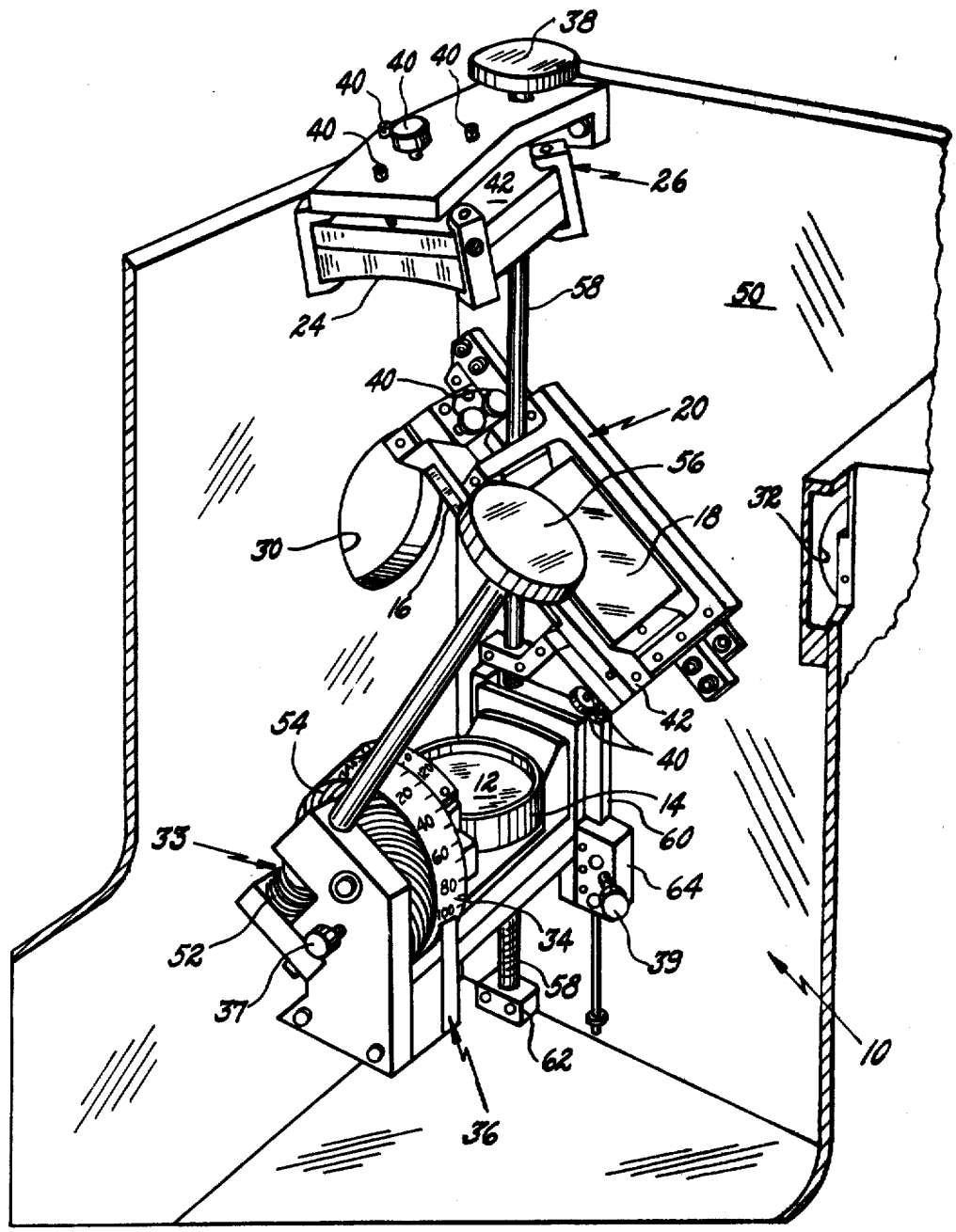
FIGURE 2 is a side orthogonal view of the optical path of a beam of light emanating from a conventional spectrophotometer and entering the reflectance attachment of this invention.

In use two equivalent bidirectional reflectance attachments are required (one for the sample compartment, the other for the reference compartment of a conventional spectrophotometer); however, since these attachments are structurally identical only one such attachment will be described.

Referring now to FIGURE 1, the bidirectional reflectance attachment 10 is shown with a powdered mineral sample 12 in the sample holder 14. Plane mirrors 16 and 18 are mounted back to back in individually adjustable mount 20. Mirror 24 is a spherical mirror mounted in adjustable mount 26 with a radius of curvature of 130 mm.

Figure 5:
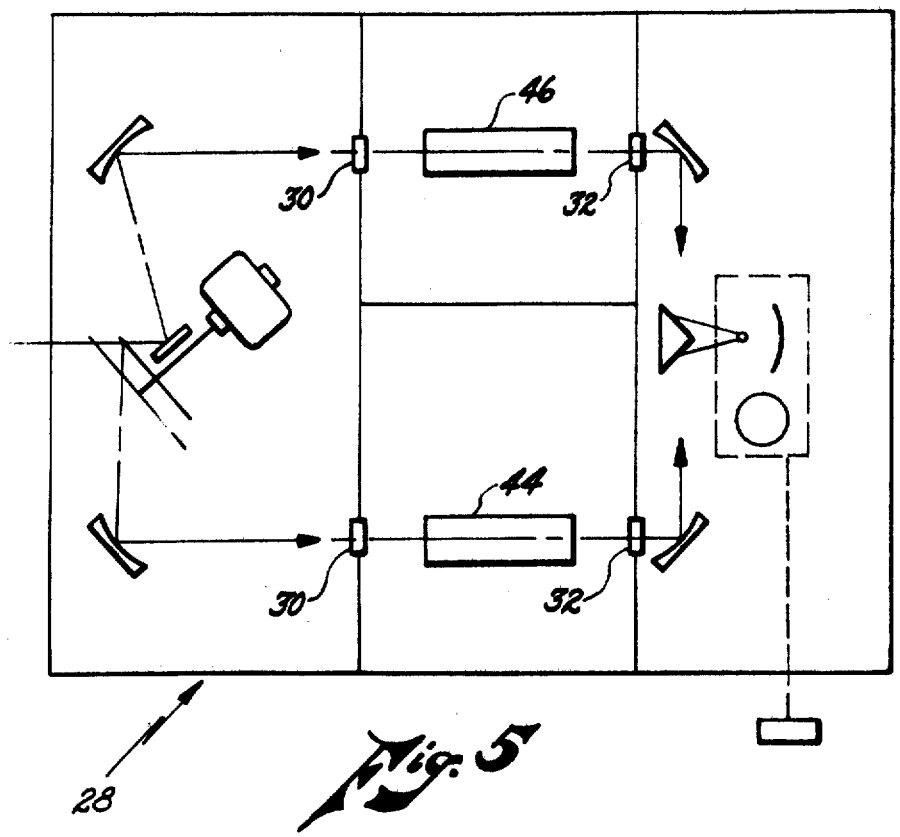
FIGURE 5 represents a schematic plan view of a portion of a conventional spectrophotometer showing the sample and reference compartments into which reflectance attachments of this invention are located.

In a conventional spectrophotometer 28 such as the Cary 14 spectrophotometer, a portion of which is shown in FIGURE 5, having sample compartment 44 and reference compartment 46, the light beam enters through apertures 30 and exits through apertures 32 or enters through apertures 32 and exits through apertures 30. The aperture through which the light beam enters is dependent upon whether the light beam is in the ultraviolet and visible range or the infrared range. In the spectrophotometer shown in FIGURE 5, the ultraviolet and visible light beam travels from left to right (as shown by the direction of the arrows) while the infrared beam travels from right to left.

Referring now to FIGURE 2, if the direction of the light beam is such that mirror 16 is first to reflect, the primary focus is relocated on the sample 12, and mirror 24 forms a conjugate focus at the point of the normal primary focus. When the beam direction is reversed, the position of the primary focus is unaltered, and mirror 24 forms a conjugate focus at the sample 12 surface. The optical arrangement (as seen in FIGURE 3) defines a phase angle of approximately 15° at the sample about one of two perpendicular axes in the plane of the sample surface. The sample 12 may be tilted up to plus or minus 45° about the other of these axes by means of the gear assembly 33 (the angle of tilt is read directly from the accompanying drum scale 34) as shown in FIGURE 1.

The entire sample supporting assembly 36 may be raised or lowered by rotation of knob 38 so that the surfaces of samples of different thicknesses may be located exactly at the focal plane. As seen from FIGURE 1 all mirrors 16, 18 and 24 are readily adjustable by means of the push screws 40 which bear against plates 42 retained by springs (not shown). The samples 12 may be placed in, or on, one of a series of sample container cups or holders 14.

For a more detailed description of the invention, we again refer to FIGURE 1. The bidirectional reflectance attachment 10 uses three mirrors 16, 18 and 24. Mirrors 16 and 18 are mounted back to back in an adjustable mount 20 secured at one end to end wall 50. The spherical mirror 24 is located above mirrors 16 and 18 and is mounted in adjustable mount 26 which is also secured at one edge to end wall 50. The mounts 20 and 26 are readily adjustable by any suitable adjustment means such as an arrangement comprising push screws 40 which bear against plates 42 which in turn are held in place by springs (not shown). The sample 12 is held in an adjustable sample supporting assembly 36. The sample supporting assembly 36 is made up of a sample holder 14 in which the sample 12 is placed and which is capable of being tilted ±45° about a horizontal axis. A suitable gear assembly 33 such as one made up of a spiral gear 54 and a pinion 52 is used to tilt the sample holder about the horizontal axis. The pinion 52 is directly connected to an adjusting knob 56 which is rotated when it is desired to tilt the sample holder 14. The angle of tilt is read directly from any suitable scale such as a drum scale 34 mounted on the spiral gear 54. Once the proper tilt is achieved the sample holder 14 is locked in place by any suitable locking means such as set screw 37. The entire sample supporting assembly 36 may be raised or lowered by rotation of adjusting knob 38. The knob 38 rotates a lead screw 58 which raises or lowers a nut 60 fixedly secured to the supporting assembly 36. The lower end of the lead screw 58 is held in place by a support 62. The entire suporting assembly 36 is held in alignment by a pair of guides 64 and is locked in position by any suitable locking means such as set screw 39.

MODE OF OPERATION

Referring now to FIGURES 2–5, one reflectance attachment 10 is placed in sample compartment 44 while the other attachment 10 is placed in reference compartment 46 of a conventional spectrophotometer 28 (see FIGURE 5). The light beam enters either through aperture 30 or 32 depending upon whether the light is in the ultraviolet, visible or infrared range. Adjustment of the mirrors and the holder assembly is made with the light in the visible range and once set the alignment is maintained over long periods of time.

Assuming that the ultraviolet and visible ranges are used, the beam enters through aperture 30 of the sample compartment and first strikes mirror 16, the beam is reflected to the sample 12 where it is in turn reflected to mirror 24 which further reflects the beam to mirror 18 which reflects the beam to detector means in the spectrophotometer 28. Simultaneously with the above operation a similar operation takes place in the reference compartment 46. By having equivalent reflectance attachments for the reference and sample compartments an equivalent optical path is followed in both the reference and sample beams, so that absorption effects within the instrument tend to cancel each other.

When the experimentation is to be performed in the infrared range the above procedure is duplicated but in the reverse direction. The light beam enters aperture 32 and first strikes mirror 18 being then reflected to mirror 24 where it is still further reflected to the sample 12. From the sample 12 the beam is reflected to mirror 16 and then reflected through aperture 30 to a detection means in spectrophotometer 28.

We claim:

1. A bidirectional reflectance attachtment for use in a double spectrophotometer comprising an end wall, a first and second mirror mounted back to back in a first adjustable mount secured at one edge thereof to said end wall, a third mirror located above said first and second mirrors mounted in a second adjustable mount secured at one edge thereof to said end wall, an adjustable sample supporting assembly mounted beneath said first and second mirrors having a sample holder for holding a sample in an upright position therein so that there is a light path from said first mirror, to said sample, then to said third mirror, and from said third mirror to said second mirror, said sample holder having means connected therewith for tilting the sample ± 45° from the horizontal, and said supporting assembly having means connected therewith for raising and lowering said assembly.

2. A bidirectional reflectance attachment as defined in claim 1 wherein said means for tilting said sample holder comprises a gear assembly having a spiral gear and pinion, said pinion being directly connected to an adjusting knob whereby rotation of said adjusting knob tilts the sample holder ± 45° from the horizontal.

3. A bidirectional reflectance attachment as defined in claim 2 wherein said means for raising and lowering said sample supporting assembly comprises a nut fixedly secured to said assembly, a rotatable lead screw threaded with said nut and a knob secured to said lead screw whereby rotation of said knob raises and lowers said assembly.

4. A bidirectional reflectance attachment as defined in claim 3 wherein said means for raising and lowering said sample supporting assembly further comprises a pair of guides for maintaining said assembly in alignment.

References Cited

UNITED STATES PATENTS 3,240,111   3/1966   Sherman et al.

RONALD L. WIBERT, Primary Examiner

V. P. McGRAW, Assistant Examiner

U.S. Cl. X.R.

250—83.3